(12) United States Patent
Pagliuca et al.

(10) Patent No.: US 9,208,925 B2
(45) Date of Patent: Dec. 8, 2015

(54) HIGH PERFORMANCE, HIGH TEMPERATURE WIRE OR CABLE

(75) Inventors: Antonio Pagliuca, Oxfordshire (GB); Andrew Caswell, Wiltshire (GB)

(73) Assignee: Tyco Electronics UK Ltd., Swindon, Wiltshire (GB)

( * ) Notice: Subject to any disclaimer, the term of this patent is extended or adjusted under 35 U.S.C. 154(b) by 452 days.

(21) Appl. No.: 12/737,059

(22) PCT Filed: May 13, 2009

(86) PCT No.: PCT/GB2009/050504
§ 371 (c)(1),
(2), (4) Date: Dec. 3, 2010

(87) PCT Pub. No.: WO2009/147417
PCT Pub. Date: Dec. 10, 2009

(65) Prior Publication Data
US 2011/0100674 A1    May 5, 2011

(30) Foreign Application Priority Data

Jun. 5, 2008 (GB) .................................. 0810294.9

(51) Int. Cl.
| | |
|---|---|
| *H01B 7/18* | (2006.01) |
| *H01B 7/295* | (2006.01) |
| *C08L 71/00* | (2006.01) |
| *C09D 171/00* | (2006.01) |
| *H01B 3/42* | (2006.01) |
| *H01B 3/44* | (2006.01) |

(52) U.S. Cl.
CPC ................ *H01B 7/295* (2013.01); *C08L 71/00* (2013.01); *C09D 171/00* (2013.01); *H01B 3/427* (2013.01); *H01B 3/445* (2013.01); *C08G 2650/40* (2013.01)

(58) Field of Classification Search
USPC .......................................... 174/120 R, 121 A
See application file for complete search history.

(56) References Cited

U.S. PATENT DOCUMENTS

| | | | |
|---|---|---|---|
| 5,393,929 A | | 2/1995 | Yagihashi |
| 5,414,217 A | * | 5/1995 | Neuroth et al. ........... 174/120 R |
| 7,750,246 B2 | | 7/2010 | Ferlier et al. |
| 8,013,076 B2 | * | 9/2011 | Haralur et al. ................ 525/422 |

(Continued)

FOREIGN PATENT DOCUMENTS

| | | |
|---|---|---|
| EP | 0 040 034 | 11/1981 |
| GB | 2 113 454 A | 8/1983 |

(Continued)

OTHER PUBLICATIONS

International Search Report for PCT/GB2009/050504 issued by the European Patent Office on Jul. 1, 2009.

(Continued)

*Primary Examiner* — Chau N Nguyen
(74) *Attorney, Agent, or Firm* — Faegre Baker Daniels LLP

(57) ABSTRACT

A wire or cable comprises a core (10) and a sheath including a wrapped film (16) of polyetherether ketone (PEEK) and a flameproofing layer (14) comprising mica particles dispersed in a polymer matrix such as a silicone. An outer coating (18) of PEEK or another polymer may be provided, which may be sintered to provide a tough outer protective covering. The PEEK and mica layers combine synergistically to provide a sheath of increased flame resistance as well as high flexibility and resistance to mechanical stresses, while being of reduced weight and diameter.

13 Claims, 3 Drawing Sheets

(56) References Cited

U.S. PATENT DOCUMENTS

| | | | |
|---|---|---|---|
| 2003/0004600 A1* | 1/2003 | Priedeman, Jr. | 700/119 |
| 2003/0141098 A1 | 7/2003 | Grogl et al. | |
| 2003/0165647 A1* | 9/2003 | Kaneko et al. | 428/36.3 |
| 2004/0194997 A1* | 10/2004 | Kuss et al. | 174/120 R |

FOREIGN PATENT DOCUMENTS

| | | | |
|---|---|---|---|
| GB | 2 156 825 A | | 10/1985 |
| GB | EP 1418219 | * | 5/2004 |
| WO | WO 89/00757 A1 | | 1/1989 |
| WO | WO 89/00762 A1 | | 1/1989 |
| WO | WO 89/00764 A1 | | 1/1989 |

OTHER PUBLICATIONS

Search Report for GB0810294.9 issued by the UK Intellectual Property Office on Aug. 27, 2008.

Search Report for GB1008268.3 issued by the UK Intellectual Property Office on Jul. 13, 2010.

* cited by examiner

HIGH PERFORMANCE, HIGH TEMPERATURE WIRE OR CABLE

This invention relates to high performance, high temperature and preferably fire resistant wires and cables for use in demanding or extreme conditions such as in drilling or mining, commercial or military aerospace and marine applications and automotive, rail and mass transport. Such cables may be exposed to extremes of temperature as well as to corrosive substances or atmospheres or to fire. High performance wires generally comprise a functional core such as an electrical conductor or optical fibre, and one or more insulating and/or protective coatings. These coatings should be flexible and not too bulky, since wires are required in many cases to be of small diameter.

Various types of polymer are known for use in wire and cable sheaths, such as polytetrafluoroethylene (PTFE) and polyetheretherketone (PEEK). PTFE has the advantage of being very tough as well as chemically inert, with a high softening point, low coefficient of friction and good electrical insulating properties.

PEEK has found increasing use in wire and cable sheathing since it has good flame resistance, being self-extinguishing with very low smoke. It also has good elongation, good flexibility in thin sections such as films and good mechanical resistance to dynamic cut-through and scrape abrasion. It can however be susceptible to arc tracking and also to attack by acetone and strong acids.

EP-A-572 177 discloses an electrical insulation laminate of porous PTFE and PEEK. The purpose of this is to provide a flexible electrical insulation material for air frame wire insulation which is lightweight with high mechanical strength, thermal resistance and chemical resistance and reduced dielectric constant.

There remains however a demand for wire and cable insulations that are resistant to fire as well as to very high temperatures. One way of imparting such flame resistance is to apply a coating comprising mica particles, typically platelets, dispersed in a polymer matrix. JP-A-2003100149 for example discloses the use of a dispersion of fine mica powder and glass frit in a silicone resin for coating fire resistant cables. Mica can however add to the cost and accordingly there is a need to reduce the mica content of cable sheaths. For example, JP-A-2006120456 seeks to avoid the use of mica by combining a glass tape to impart tensile strength and dimensional stability with a silicone tape to impart heat resistance, electrical characteristics and adhesiveness.

JP-A-2000011772 discloses a fire resistant coating made with a cross-linked silicone rubber mixed with aluminium hydroxide and mica powder.

There is also a requirement for wires and cables of reduced diameter, which could be achieved by using sheaths of reduced thickness.

According to the present invention, a high performance, high temperature wire comprises a core and a sheath including a wrapped film made from polyetheretherketone (PEEK), or a blend or alloy of PEEK with another polymer, the blend or alloy containing at least 30% by weight of PEEK, preferably at least 50% and more preferably at least 80%. The wrapped film may include other polymeric components, and may be combined with other polymeric layers and in particular with flameproofing or fire-resistant layers.

In particular embodiments of the invention, the PEEK tape is combined with a fire-resistant layer or for example one comprising mica dispersed in a polymeric matrix such as a silicone, a silica-based polymeric matrix or a polymeric siloxane. This fire-resistant layer may be in the form of a separate layer radially inside or outside the PEEK layer. Alternatively it may be combined with a film formed from a PEEK tape.

The fire-resistant layer may have a backing layer, for example a supporting layer of glass fibre or a layer of another polymer such as a polyolefin.

In another embodiment the PEEK film may comprise two layers of PEEK with a layer of mica between them. The mica layer may comprise a sheet or foil or a layer of particles. It may suitably have a thickness of 30 to 200 µm, preferably not more than 100 µm.

An additional outer layer may be provided for additional strength, flexibility and/or flame resistance. This outer layer may for example comprise polytetrafluoroethylene (PTFE), polyvinylidene fluoride (PVDF), ethylenetetrafluroethylene (ETFE), PEEK, polyolefins, polyamides, siloxanepolyetherimide (SILTONE), thermoplastic polyetherimides such as Ultem, polyesters, silicones, polyurethanes, epoxy resins, acrylic resins or copolymers or blends or alloys of any these. This outer layer may be sintered.

It has been found that the PEEK film and mica-containing film can combine synergistically to provide a wire or cable sheath of increased flame resistance as well as resistance to mechanical stresses such as bending, stretching and abrasion. This means that relatively thin films can be used to produce wires of reduced overall diameter. The PEEK tapes used according to the present invention are preferably of a thickness of from 10-100 µm.

The coatings described above can be applied to numerous different types of core, notably conductive wires or cables, for example copper, which may be nickel or tin coated or silver-plated, aluminium, typically copper-clad aluminium, silver or steel. For other purposes, non-metallic cores such as carbon fibre or polymeric or ceramic cores may be used. The cable may be single core or multi-core or may comprise a twisted pair of wires, a multi-strand core or a braid. Any of these cores may be coated with copper, nickel, tin or silver.

Preferred embodiments of the invention will now be described with reference to the accompanying drawings wherein.

Figure 1:
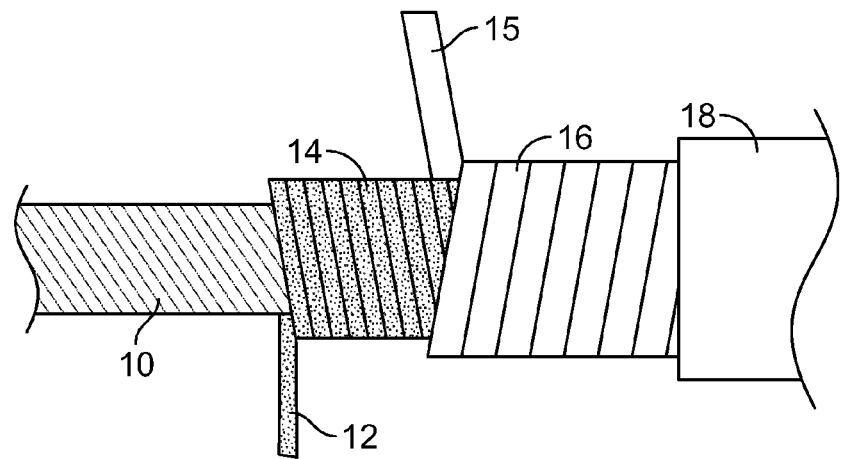
FIG. 1 shows how an insulated wire according to the present invention can be made by wrapping PEEK and other polymeric tapes.

Referring first to FIG. 1, a multi-stranded cable 10, which may for example be of copper, uncoated or coated with nickel, silver or tin, aluminum, which may be copper clad, steel or a non-metallic cable such as carbon fibre, polymer fibre or ceramic fibre has a three-layer sheath applied to it by winding and extrusion. A first tape 12, for example of silicone with mica platelets distributed in it, is wound on spirally to form a first wound coating 14. Then a second tape 15, for example of polyetheretherketone, is wound on spirally to form a second coating 16. Finally an outer layer 18 of another polymer is applied, for example by extrusion.

Figure 2:
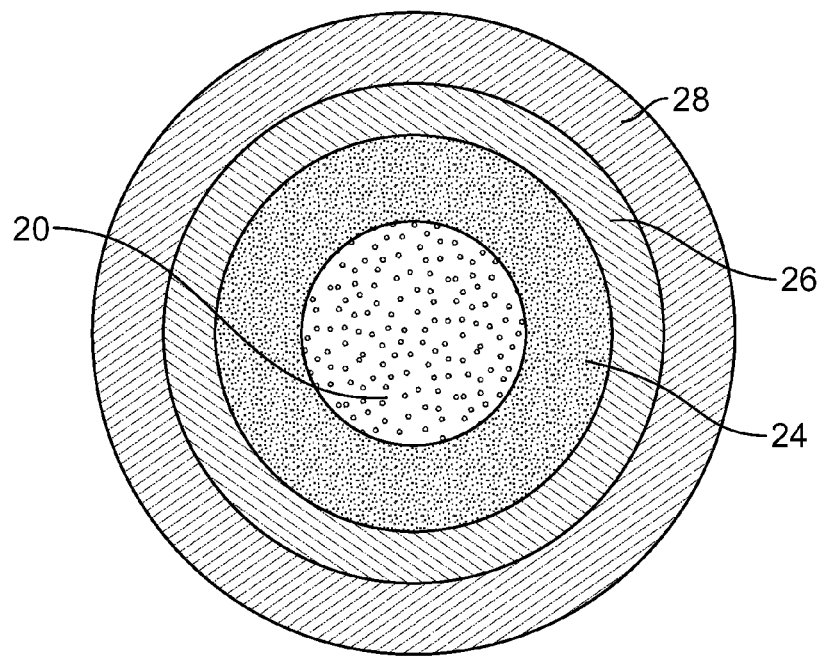
FIG. 2 is a cross-section through a multi-coated wire in accordance with a first embodiment of the invention.

FIG. 2 shows a cross-section through a cable to which a three-layer sheath has been applied, for example as described in relation to FIG. 1. The innermost layer 24, immediately surrounding the cable 20, is a mica-containing sheath to impart flame resistance. This may for example be a mica-containing silicone tape which may be backed with a glass fibre and/or with a polyethylene layer. This layer may be applied in single or multiple layers of the same or different thicknesses.

The second layer 26 comprises polyetheretherketone (PEEK) wound tape having a thickness of 10 to 100 μm. The PEEK may be used alone or blended or alloyed with other polymers that preferably contain at least 60%, and more preferably at least 80%, of PEEK.

The outer layer 28 is optional according to the invention, but when used can be either extruded or wrapped. It provides an encapsulation layer to form an additional layer of protection to the cable. Any of the polymers, polymer blends or alloys listed above for this layer can be used. PTFE for example could sintered to provide exceptional chemical resistance as required by the aerospace market. The PEEK layer itself could be sintered to provide a tough outer layer in its own right.

The synergistic combination of mica-containing polymer and PEEK in this embodiment can provide a high temperature, fire resistant wire with potentially low weight and low overall diameter. The mica can provide insulation and fire resistance up to 1000° C., and in combination with the PEEK provides very good mechanical properties including dynamic cut-through resistance, even at high temperatures, non burning characteristics and very low smoke emission. The PEEK layer could be sintered or fused to provide a tough outer layer in its own right.

Figure 3:
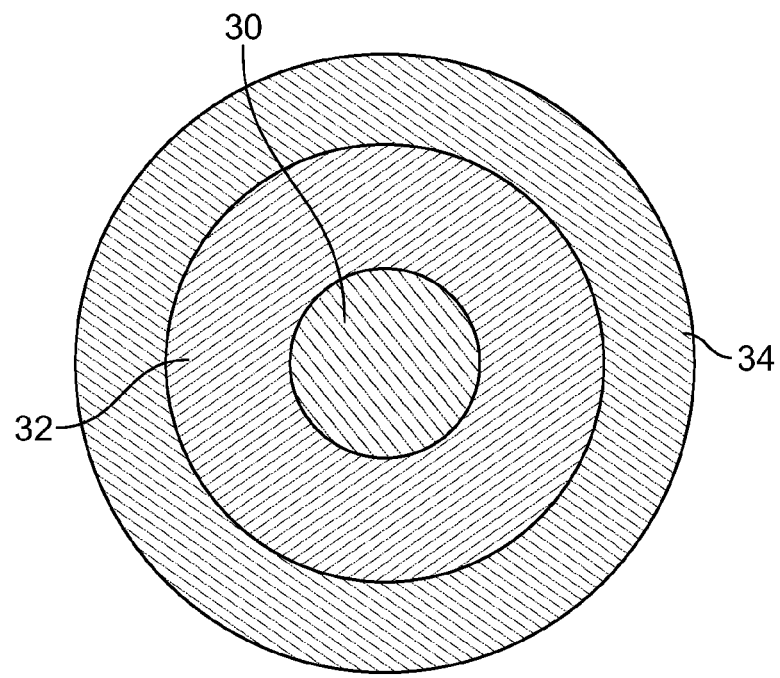
FIG. 3 is a cross-section through a coated wire in accordance with a second embodiment of the invention.

Referring now to the embodiment of FIG. 3, the core cable or wire 30 can be of similar to that of FIG. 2 but the first layer 32 of the sheath is a combined wrapped layer formed from a single or double mica layer on a PEEK film or tape. The mica component may for example comprise a mica/silicone tape, with or without a polyethylene layer. This embodiment may also include an optional outer layer 34, for which the range of contents may be the same as for the embodiment of FIG. 2. Again, the outer layer may be sintered.

Figure 4:
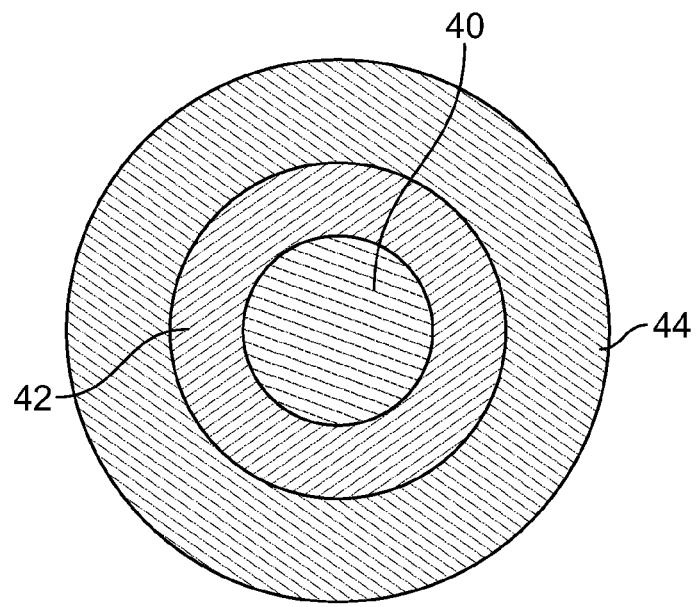
FIG. 4 is a cross-section through a third embodiment of the invention.

In the embodiment of FIG. 4, the core 40 is first sheathed with an inner layer 42 comprising a wrapped film of PEEK or of a blend or alloy of PEEK with another polymer. Around this is an outer layer 44 which may be applied by wrapping or extrusion and may comprise a flameproofing layer of mica and/or alumina particles dispersed in a polymer such as silicone, or a protective layer of any of the polymers used for the outer layers of the wires or cables illustrated in FIGS. 2 and 3. Again, this outer layer 44 may be sintered to provide a tough outer layer.

Figure 5:
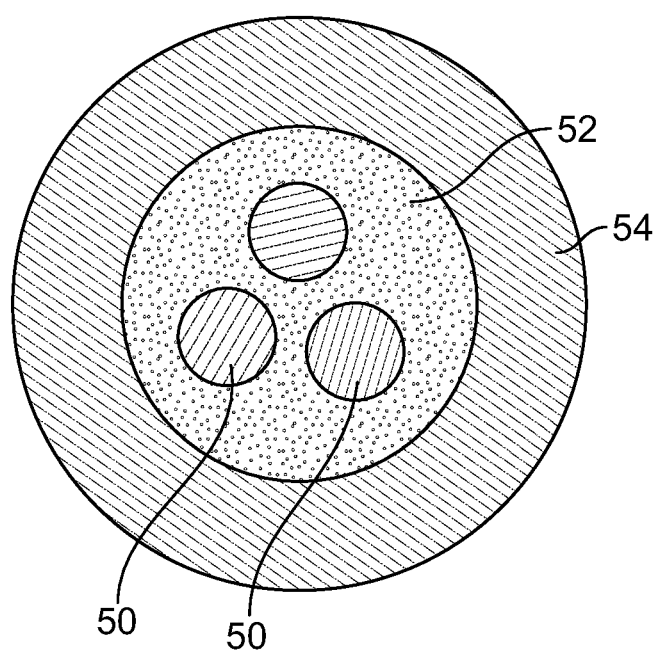
FIG. 5 is a cross-section through a fourth embodiment of the invention.

As illustrated in FIG. 5, A wrapped PEEK film 54, or a wrapped film of a blend or alloy of PEEK with one or more other polymers, can be used as an outer protective layer for a wide variety of wire or cable constructions. This could include a conductor with another polymeric insulation, a complete cable construction with or without a braid, such as a twisted pair or a quad of twisted pairs such as Cat 7 cable. In the embodiment illustrated in FIG. 5, the PEEK outer jacket is formed around a three-core cable 50 with a flameproofing or fire-resistant insulation layer 52 of mica particles in a matrix of silica or the like. The PEEK outer jacket may be fused or sintered.

The invention claimed is:

1. A wire or cable comprising a core and a polymeric sheath, wherein said sheath includes a first layer comprised of a polymer matrix having a plurality of mica particles dispersed therein and comprised of at least one of silicone rubber, a silica-based polymeric matrix, and a polymeric siloxane, and a second layer comprised of a wrapped film of polyetherether ketone (PEEK), or a polymer blend or alloy of PEEK containing at least 30% by weight of PEEK and another polymer, the second layer having a thickness of 5 to 100 μm and being adjacent the first layer.

2. The wire or cable according to claim 1, wherein the second layer comprises a blend or alloy containing at least 50% by weight of PEEK.

3. The wire or cable according to claim 2, wherein the second layer comprises a blend or alloy containing at least 80% by weight of PEEK.

4. The wire or cable according to claim 1, wherein the second layer comprises two layers of PEEK with a layer of mica between them.

5. The wire or cable according to claim 1, wherein the first layer is formed from a wrapped tape.

6. The wire or cable according to claim 5, wherein the wrapped tape of the first layer has a supporting or backing layer.

7. Previously Presented) The wire or cable according to claim 6, wherein the wrapped tape of the first layer is a glass fibre-backed tape.

8. The wire or cable according to 1, wherein the first layer is formed as an inner layer around the core, with the second layer wrapped around it.

9. The wire or cable of claim 1, wherein the polymeric sheath further includes an outer protective polymer layer at least partially comprised of polytetrafluoroethylene (PTFE).

10. A wire or cable, comprising:
   a core; and
   a polymeric sheath generally surrounding the core, the polymeric sheath being comprised of a polyolefin film and a combined inner layer containing at least 30% polyetheretherketone (PEEK) and a polymeric tape with mica particles dispersed therein and comprised of at least one of silicone rubber, a silica-based polymeric matrix, and a polymeric siloxane.

11. The wire or cable of claim 10, wherein the polyolefin film defines an outer layer outward of the combined inner layer.

12. The wire or cable of claim 10, wherein the PEEK layer has a thickness of approximately 5-150 μm.

13. The wire or cable of claim 10, wherein the PEEK layer is comprised of a polymeric blend having at least approximately 50% by weight of PEEK.

* * * * *